Patented Sept. 16, 1947

2,427,537

UNITED STATES PATENT OFFICE 2,427,537

DISAZO DYES FROM TETRAZOTIZED DIHYDROXY BENZIDINES

Fritz Straub, Kaiseraugst, and Jakob Brassel and Peter Pieth, Basel, Switzerland, assignors to Society of Chemical Industry in Basle, Basel, Switzerland, a Swiss firm No Drawing. Application August 16, 1943, Serial No. 498,883. In Switzerland February 18, 1941

11 Claims. (Cl. 260—182)

This application is a continuation-in-part of our copending application Serial No. 431,172, filed February 16, 1942.

The present invention is concerned with valuable new disazo dyestuffs, and a process for preparing the same. The present invention is particularly concerned with direct dyeing cotton dyestuffs (also called substantive dyestuffs), and still more particularly with dyestuffs capable of being metallized, for instance coppered, in substance, in the dyebath or on the fiber, as the case may be.

According to the present invention tetrazotized 3:3'-dihydroxy-4:4'-diaminodiphenyl is coupled with two molecular proportions of coupling components as defined hereinafter.

3:3'-dihydroxy-4:4'-diaminodiphenyl, which is a known compound and which may be obtained for instance by saponifying dianisidine by means of aluminum chloride, has not hitherto found any industrial use. Although a few dyestuffs prepared with tetrazotized 3:3'-dihydroxy-benzidine have been described in the literature, the said compound has generally been regarded to be of no practical value. This is probably due to several facts. First of all it was generally believed that the said product would be too expensive for the commercial manufacture of dyestuffs. Furthermore, the very few dyestuffs hitherto prepared with the said tetrazo compound did not show properties which might make them compete successfully with other dyestuffs, and it is to be remarked that, according to the prescriptions found in the literature, correct coupling is in most cases not brought about, which obviously does not lead to correct disazo dyestuffs.

According to the present invention it has been found that the cost of 3:3'-dihydroxy-4:4'-diaminodiphenyl is by no means prohibitive for the manufacture of dyestuffs therefrom, since such dyestuffs as hereinafter defined show very valuable properties which more than outweigh any difficulties encountered in preparing the said starting material. Further, it will be shown hereinafter that correct coupling to form correct disazo dyestuffs can be brought about, and that dyestuffs of much superior properties can be produced thereby.

For the sake of simplicity coupling may be carried out with two molecular proportions of the same coupling component. However, it is not unduly difficult to effect coupling with two different coupling components since tetrazotized 3:3'-dihydroxy-4:4'-diaminodiphenyl has a great tendency to couple first with one diazo group and afterwards with the other.

3:3'-dihydroxy-4:4'-diaminodiphenyl may be obtained by saponification of dianisidine by means of aluminum chloride and may be purified if necessary according to known methods. It may be tetrazotized in known manner and the tetrazo compound may be used immediately after tetrazotizing or may be separated, as described in the examples below.

According to the present invention a tetrazotised 3:3'-dihydroxy-4:4'-diaminodiphenyl is united with 2 molecular proportions of the same or different coupling components of which at least one is a hydroxynaphthalene free from sulfonic acid groups.

Such hydroxynaphthalenes are used according to this feature of the invention which contain neither a sulfonic acid group as nuclear substituent nor in external linkage. It is advantageous that these hydroxynaphthalenes should be completely free from any substituents which have a strong solubilizing action such as carboxylic acid groups. They may advantageously contain at least one further substituent, preferably only one further substituent of another kind, for example an auxo-chromic group, such as a hydroxyl group, an amino (including substituted amino) group, an alkoxy group or a sulphamido group, and these substituents may, for example, be distributed on the two benzene rings forming the naphthalene nucleus. It will be advantageous to use such hydroxynaphthalenes which permit a coupling in the ortho-position to the hydroxyl group.

Such components are, for example, the various dihydroxynaphthalenes, such as -1:5-, 2:6- and -2:7-dihydroxynaphthalene, 2-amino-7-hydroxynaphthalene, 1-amino-7-hydroxynaphthalene, 2:6-dihydroxynaphthalene - monoglycerine ether, as well as N-substituted amino-hydroxynaphthalenes, in which the amino group, for example, can be substituted by alkyl or hydroxyalkyl radicals. Furthermore such hydroxynaphthalenes also come into consideration which contain other substituents besides those mentioned above, e. g., a sulfonamide group.

Particularly valuable dyestuffs are obtained if hydroxynaphthalenes are used which are absolutely free from water solubilizing groups and, for example, are also free from carboxyl groups. These dyestuffs can be advantageously dyed from baths rendered alkaline with alkali hydroxide.

According to another feature of the present invention a tetrazotized 3:3'-dihydroxy-4:4'-diaminodiphenyl is coupled with two molecular proportions of coupling components at least one of which is a 1-hydroxynaphthalene containing an auxochromic group in the 8-position. Such auxochromic groups are, for instance, an amino or a substituted amino group, or a further hydroxyl group, or any other group possessing auxochrome properties. These coupling components may carry further substituents in suitable positions of the naphthalene nucleus, for instance nonsolubilizing substituents, such as halogen.

In all the instances mentioned above coupling is effected in an alkaline medium. It is to be remarked, however, that there are many coupling components, especially those of the naphthalene series, which do not combine in a satisfactory manner with tetrazotized 3:3'-dihydroxy-4:4'-diaminodiphenyl when coupling occurs in the usual manner, i. e., in a medium alkaline with sodium carbonate, even if pyridine or similar promoters are added. The combination is often incomplete to such an extent that only little or no disazo dyestuff is produced, and a monoazo dyestuff is obtained as main product. It is a further feature of the present invention that in all instances where combination is slow and/or incomplete with the usual coupling methods, coupling is effected in a medium alkaline with a hydroxide of the alkali or alkaline earth metal series including ammonia. It is often desirable to use strongly caustic alkaline media, for instance strong solutions of caustic potash or soda, but, in other instances, the hydroxides of calcium, barium, strontium or magnesium are suitable too, whereas media substantially free from carbonate generally appear to be desirable whenever combination is difficult.

If these reaction media are properly used combination may also be effected with 2-hydroxynaphthalene sulfonic acids, such as 2-hydroxynaphthalene-6-sulfonic acid, 2-hydroxynaphthalene-3:6-disulfonic acid, as well as with 2-amino-5-hydroxynaphthalene-7-sulfonic acid and 2-amino-5-hydroxynaphthalene-1:7-disulfonic acid, substantially avoiding the production of monoazo-dyestuffs.

The disazo dyestuffs of the present invention are suitable for dyeing and printing the most diverse materials, especially cellulose fibers, such as cotton and other vegetable fibers, rayon from regenerated cellulose including staple fibers, and also for dyeing and printing animal fibers such as wool, silk and leather. Due to the fact that the said dyestuffs are derived from an ortho-hydroxydiazo compound they are capable of forming complex metal compounds, for instance, with the metals copper, cobalt, nickel, iron, chromium, vanadium, manganese.

Many of the foregoing dyestuffs yield very valuable complex metal compounds if treated in substance with agents yielding metal. This is especially true of those dyestuffs which contain more than two sulfonic acid groups, for instance those derived from two coupling components belonging to the group of hydroxynaphthalene disulfonic acid coupling components. With other dyestuffs it may be more advantageous to effect metallization during or, still better, after dyeing according to the known aftertreating methods. With special advantage use may be made of the dyeing methods described in U. S. Patents 2,148,659 and 2,185,905, whereby metallizing is preferably carried out with agents yielding metal which are stable towards alkalies, for instance complex tartrates of copper or other metals.

In some cases it may also be useful to treat some dyestuffs as mentioned above in substance with such alkaline metallizing agents.

Furthermore it is possible to make use of complex metal compounds of the dyestuffs according to the present invention for coloring masses, varnishes, lacquers, resins, both artificial and natural, and spinning solutions.

Whether it is preferable to produce the aforementioned complex metal compounds on the fiber or in substance depends on various properties thereof, inter alia, whether the complex metal compounds are soluble, whether the metal-free dyestuffs possess sufficient affinity for the fiber to be dyed, etc.

The following examples illustrate the invention, the parts being by weight unless otherwise stated:

*Example 1*

21.6 parts of 3:3'-dihydroxy-4:4'-diaminodiphenyl, in the form of its dichlorhydrate, are stirred in 100 parts of water and 12 parts of concentrated hydrochloric acid and is tetrazotized by addition of an aqueous solution of 13.8 parts of sodium nitrate at 5–8° C. When tetrazotization is complete, the suspension is cooled to 3° C., neutralized by addition of 6.4 parts of soda and filtered to obtain the precipitated tetrazo compound.

33 parts of 2:6-dihydroxynaphthalene are dissolved in 200 parts of water and 11.5 parts of caustic potash in a stream of nitrogen, and the solution is cooled to 5° C. The filtered tetrazo compound is added, and coupling is allowed to take place for 4 hours at 5–8° C., then for 24 hours at 10–15° C. and, finally until the reaction is complete, at 20–25° C. The reaction mass is then diluted with 500 parts of water, and the new dyestuff is precipitated by the addition of common salt.

It possesses the formula

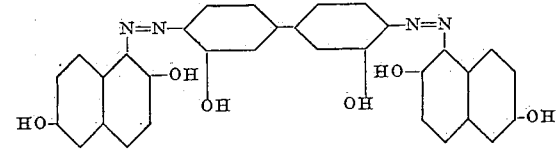

and is a greyish-black powder which dissolves in water and in 10 percent caustic soda to a blackish blue-violet, in 10 percent soda solution to a blackish greenish-blue and in concentrated sulfuric acid to a blue solution. The new dyestuff, when dyed on cotton and after-coppered by a one or a two bath process, yields navy blue shades of very good fastness.

*Example 2*

21.6 parts of 3:3'-dihydroxy-4:4'-diaminodiphenyl are tetrazotized and the reaction mixture neutralized and the tetrazo compound filtered off.

33 parts of 1:5-dihydroxynaphthalene are dissolved in 60 parts of water and 11.2 parts potassium hydroxide and the solution cooled to 3° C. The tetrazo compound prepared as above is added and coupling carried out for 3 hours at 3 to 5° C. for 2 hours at 5 to 10° C. for 16 hours at 10 to 15° C. and until termination of the reaction at 20 to 25° C. The coupling mass is then diluted with 500 parts of water and the dyestuff precipitated by the addition of sodium chloride.

When dried the new dyestuff is a black powder which yields fast greyish black shades on being dyed and coppered on cotton by either a one or two bath process.

*Example 3*

21.6 parts of 3:3'-dihydroxy-4:4'-diaminodiphenyl are tetrazotized, the tetrazo compound neutralized and filtered off.

33 parts of 2:7-dihydroxynaphthalene are dissolved in 100 parts of water and 46 parts by volume of caustic potash solution of 50 percent by volume in a nitrogen stream and cooled to 3° C. The filtered tetrazo compound is added and coupling carried out for 3 hours at 3–5° C. for 2 hours at 5 to 10° C., and for 16 hours at 10 to 20° C. Hereupon the reaction mass is diluted with 500 parts of water at 40° C. and the new dyestuff precipitated by the addition of sodium chloride.

The dried powder is a black bronzy substance which yields navy blue shades with very good fastness properties on being dyed and coppered on cotton by either a one or two bath process.

With the dyestuffs of Examples 1 to 3 inclusive dyeing is preferably effected in a caustic alkaline dyebath (see Patent No. 2,185,905). The same is true with the dyestuffs of Examples 4 to 7 below.

*Example 4*

21.6 parts of 3:3'-dihydroxy-4:4'-diaminodiphenyl are tetrazotized and then neutralized and the tetrazo compound filtered off.

33.4 parts of 1-amino-7-hydroxynaphthalene are dissolved in 200 parts of water with 5.8 parts of caustic potash and the solution cooled to 5° C. The above mentioned tetrazo compound is added and coupling carried out at first at 5 to 10° C. and then at 10 to 20° C. until termination of the reaction. The coupling mass is diluted with 500 parts of water and the new dyestuff precipitated by adding sodium chloride.

When dry it is a violet black powder which yields grey shades which have very good fastness properties on being dyed and coppered on cotton by either one or two bath process.

*Example 5*

21.6 parts of 3:3'-dihydroxy-4:4'-diaminodiphenyl are tetrazotized as in Example 4 and filtered off.

32.8 parts of 2-amino-7-hydroxynaphthalene are dissolved in 240 parts of water and 23.2 parts by volume of caustic soda solution of 30 percent NaOH in a nitrogen stream and cooled to 5° C. The above mentioned tetrazo compound is then added and coupling carried out for 4 hours at 5 to 8° C. for 16 hours at 10 to 15° C. and to complete the reaction for 48 hours at 20 to 25° C. Hereupon the coupling mass is diluted with 800 parts of water and the dyestuff precipitated by the addition of sodium chloride.

When dry it is a dark powder which yields fast navy blue shades on being dyed and coppered on cotton by either a one or two bath process.

Similar navy blue shades are obtained if, instead of the 2-amino-7-hydroxynaphthalene, 2-amino-6-hydroxynaphthalene is used.

*Example 6*

21.6 parts of 3:3'-dihydroxy-4:4'-diaminodiphenyl are tetrazotized and the neutralized tetrazo compound filtered off.

49 parts of 2:6-dihydroxynaphthalene-monoglycerine ether are dissolved in 100 parts of water and 23 parts of caustic potash. The mixture is cooled to 3° C. and the above mentioned tetrazo compound is added and coupling carried out for 3 hours at 3–5° C., for 2 hours at 5–10° C., for 16 hours at 10–15° C. and until the termination of the reaction at 20 to 25° C. Hereupon it is diluted with 800 parts of water at 40° C., the dyestuff precipitated by adding sodium chloride, and filtered. The residue is stirred into 2000 parts of water at 40° C., rendered weakly acid with acetic acid of 25 percent strength, filtered off, and washed with water.

The new dyestuff when dry is a violet-black powder insoluble in water. When dissolved in soda of 10 percent strength and in concentrated sulfuric acid, it yields a blue and when dissolved in caustic soda solution of 10 percent strength it yields a blackish red solution. It produces navy blue shades of very good fastness properties on being dyed and coppered on cotton by either a one or two bath process.

*Example 7*

21.6 parts of 3:3'-dihydroxybenzidine are tetrazotized in known manner in the presence of hydrochloric acid with sodium nitrite. The crystalline precipitated tetrazo compound is added at 5° C. to a solution of 44.6 parts of 1-naphthol-8-sulfonamide in 36 parts by volume of a caustic potash solution of 50 percent by weight KOH. The temperature increases spontaneously to 30° C. Coupling is carried out for two days at 25 to 30°, then the coupling mixture is diluted with 800 parts of hot water and after boiling for a short period the dyestuff is salted out. The dyestuff is filtered off and after drying represents a dark green bronzy powder which dissolves in water and cold soda solution to a bordeaux red, in hot soda solution and caustic alkalies to a violet and in concentrated sulfuric acid to a greenish blue solution. It yields navy blue shades which are fast to washing and to light on being dyed and coppered on vegetable fibers by either a one or two bath process.

*Example 8*

2.5 parts of the dyestuff obtained according to Example 7 are dissolved hot in 250 parts of water with the addition of a little caustic soda solution. This solution is added to a dye bath consisting of 2000 parts of water and 2 parts of sodium hydroxide. At 50° C. 100 parts of well wetted cotton are entered and the temperature raised to 95° C. within half an hour, and then 30 parts of Glauber's salt are added. After dyeing for about ¾ of an hour at this temperature the bath is allowed to cool to 80° C., and then 2 parts of a complex copper sodium tartrate are added and coppering carried out for half an hour at from 80 to 90° C. The cotton is well rinsed and if necessary soaped. It is dyed a fast navy blue.

It is further to be understood that the term "hydroxide of the alkali metal series" includes aqueous solutions of ammonia.

What we claim is:

1. Disazo dyestuffs of the general formula

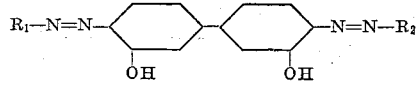

wherein $R_1$ and $R_2$ stand for radicals of hydroxy naphthalene coupling components containing as sole additional substituent a member of the group consisting of hydroxyl, amino, alkoxy and sulfamide groups.

2. Disazo dyestuffs of the general formula

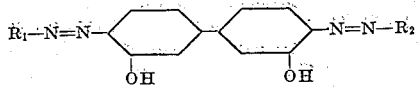

wherein $R_1$ and $R_2$ stand for radicals of dihydroxy naphthalene coupling components free from further substituents.

3. Disazo dyestuffs of the general formula

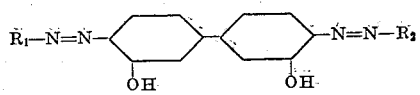

wherein $R_1$ and $R_2$ stands for radicals of aminohydroxy naphthalene coupling components free from further substituents.

4. Disazo dyestuffs of the general formula

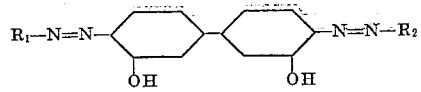

wherein $R_1$ and $R_2$ stand for radicals of hydroxy naphthalene sulfamide coupling components free from further substituents.

5. Disazo dyestuffs of the general formula

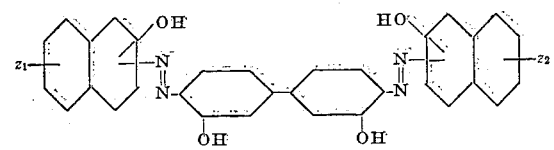

wherein the azo groups are attached to the naphthalene radicals in ortho-position to the respective hydroxyl groups, and $z_1$ and $z_2$ stand for substituents selected from the group consisting of hydroxyl, amino, alkoxy, and sulfamide groups.

6. Disazo dyestuffs of the general formula

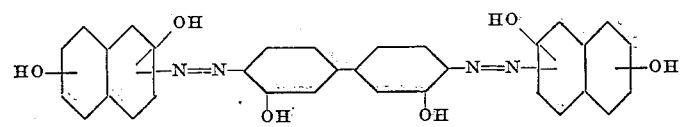

wherein the azo groups are attached to the naphthalene radicals in ortho-position to the respective hydroxyl groups.

7. Disazo dyestuffs of the general formula

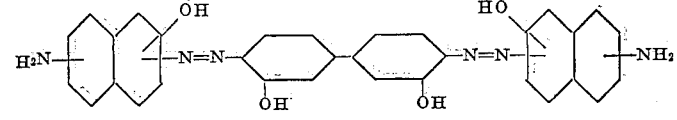

wherein the azo groups are attached to the naphthalene radicals in ortho-position to the respective hydroxyl groups.

8. Disazo dyestuffs of the general formula

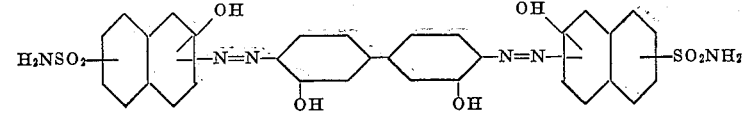

wherein the azo groups are attached to the naphthalene radicals in ortho-position to the respective hydroxyl groups.

9. The disazo dyestuff of the formula

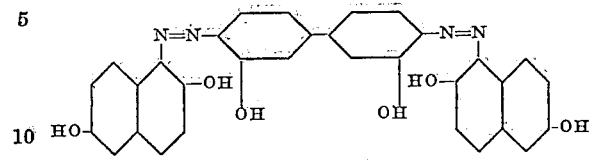

10. The disazo dyestuff of the formula

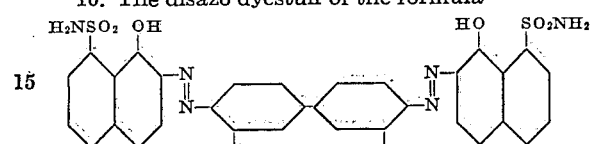

11. The disazo dyestuff of the formula

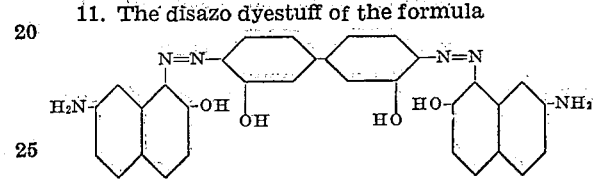

FRITZ STRAUB.
JAKOB BRASSEL.
PETER PIETH.

REFERENCES CITED

The following references are of record in the file of this patent:

UNITED STATES PATENTS

| Number | Name | Date |
|---|---|---|
| 1,210,751 | Anderwert et al. | Jan. 2, 1917 |
| 1,889,732 | Stusser et al. | Nov. 29, 1932 |
| 2,193,438 | Taube et al. | Mar. 12, 1940 |
| 2,241,796 | Taube et al. | May 13, 1941 |

FOREIGN PATENTS

| Number | Country | Date |
|---|---|---|
| 6,874 | Great Britain | Jan. 31, 1891 |
| 102,881 | Great Britain | Jan. 3, 1917 |
| 163,896 | Switzerland | Nov. 16, 1933 |